United States Patent [19]

Friel, Jr. et al.

[11] Patent Number: 5,357,717
[45] Date of Patent: Oct. 25, 1994

[54] MANUAL FILE AND SHARPENING TOOL

[75] Inventors: Daniel D. Friel, Jr., Kennett Square, Pa.; Edwin Parkell, Galena, Md.

[73] Assignee: Edgecraft Corporation, Avondale, Pa.

[21] Appl. No.: 2,229

[22] Filed: Jan. 8, 1993

[51] Int. Cl.⁵ .............................................. B24D 15/00
[52] U.S. Cl. ................................. 451/494; 451/523; 451/557
[58] Field of Search ............... 51/362, 391, 392, 393, 51/204, 205 R; 29/80; 15/104.94, 145

[56]   References Cited

U.S. PATENT DOCUMENTS

| | | | |
|---|---|---|---|
| 2,503,619 | 4/1950 | Hopps | 51/362 |
| 2,662,353 | 12/1953 | Bergmann | 51/362 |
| 3,226,888 | 1/1966 | Erenyi | 51/362 |
| 4,607,464 | 8/1986 | Schwartz | 51/362 |
| 4,667,447 | 5/1987 | Barton | 51/362 |

*Primary Examiner*—Jack W. Lavinder
*Attorney, Agent, or Firm*—Connelly & Hutz

[57]   ABSTRACT

A tool for filing or abrading surfaces or for sharpening instruments such as knives, chisels and the like includes two spaced thin ferromagnetic rails having co-planar upper edges. A magnet is located between the rails with a ferromagnetic plate magnetically held to the rail. The plate has an exposed abrasive coated surface. A first magnetic pole of the magnet concentrates and conducts magnetic flux to the plate through the rails with sufficient force to hold the plate in position against the upper edges of the rails without the need for a retaining cavity to further restrain the plate from moving during use.

19 Claims, 3 Drawing Sheets

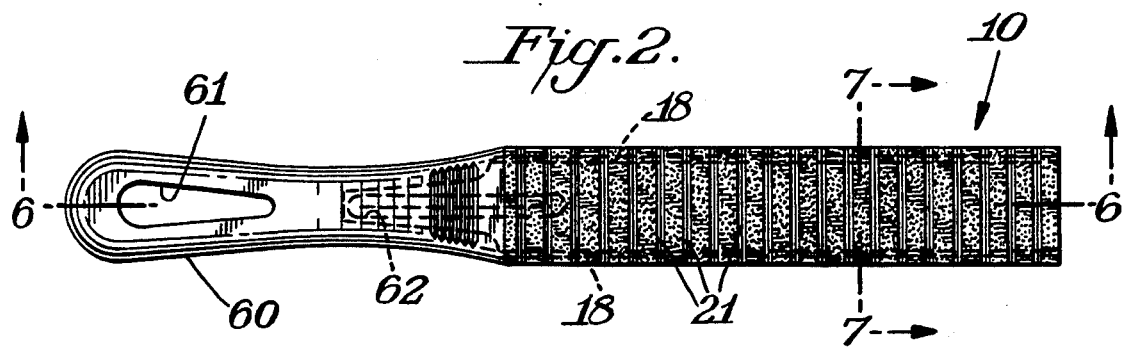
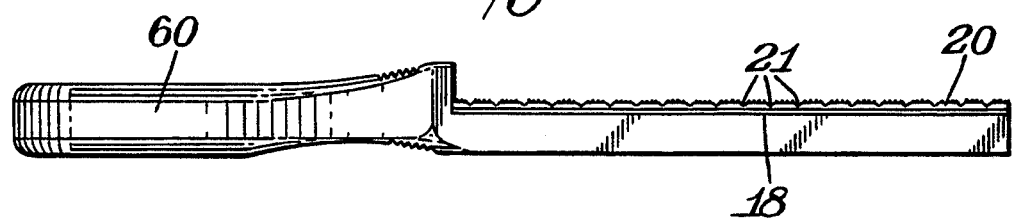
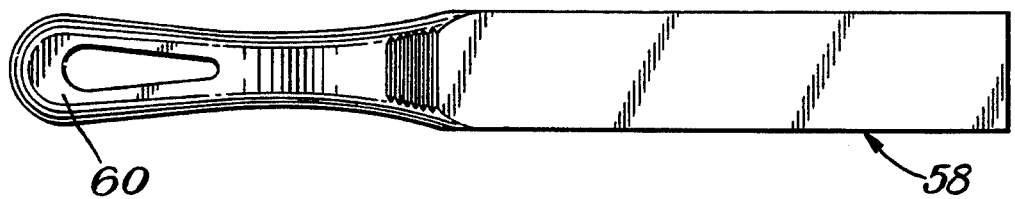
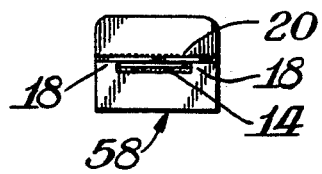
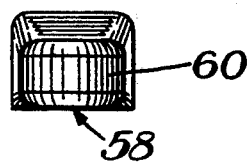

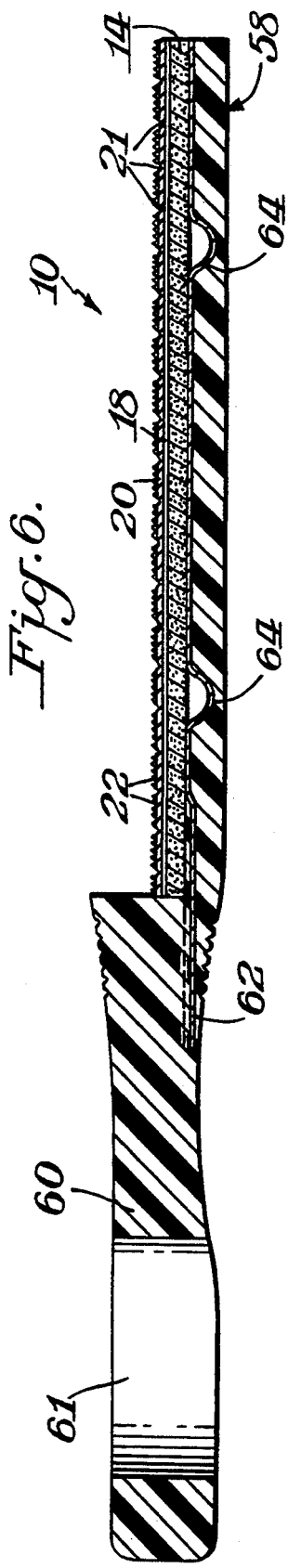
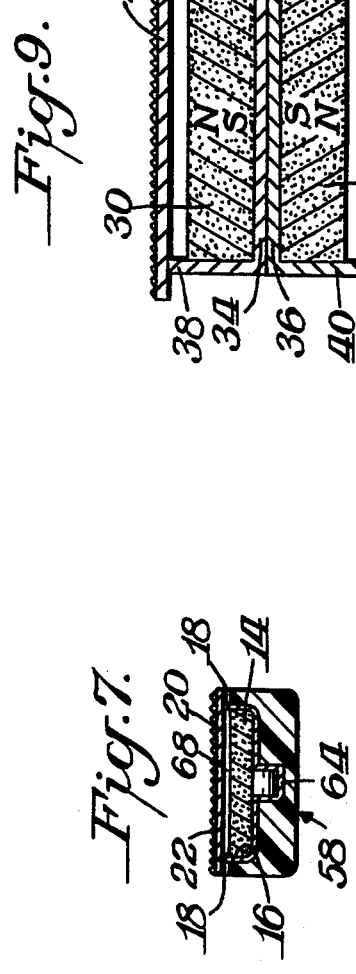
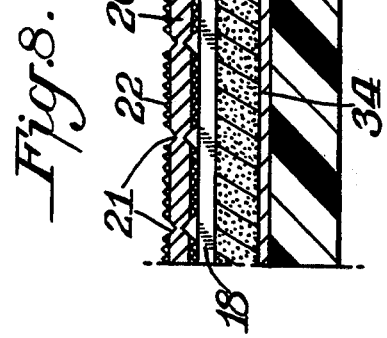
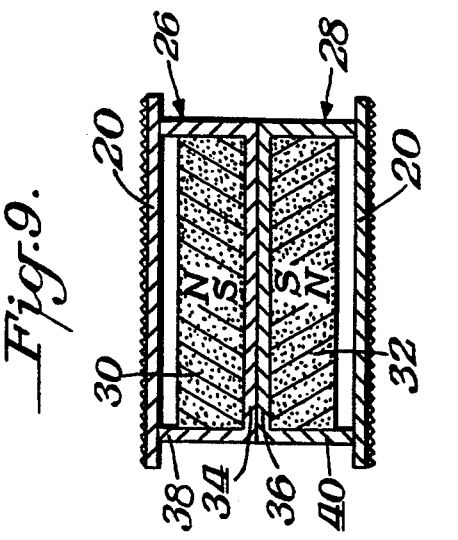
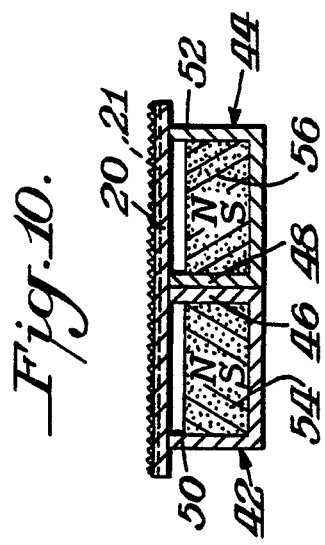

MANUAL FILE AND SHARPENING TOOL

BACKGROUND OF THE INVENTION

Various devices have been available in the prior art for filing or abrading surfaces or for sharpening instruments such as knives, chisels and the like. A common form of such devices is a file which is frequently a one piece body having a handle. The body has an integral abrading surface. This form of tool does not permit replacement of the abrading surface.

SUMMARY OF THE INVENTION

An object of this invention is to provide a manual file and sharpening tool which is an improvement of the above types of prior art approaches.

A further object of this invention is to provide such a tool wherein the abrasive surface can be readily replaced.

A still further object of this invention is to provide such a tool which does not require a retaining cavity and thereby permits full use of the tool.

This invention relates to manual filing and sharpening tools consisting of a handle and a unique magnetic means which in a preferred configuration holds one or more thin and flexible ferromagnetic plates coated with abrasive in firm conformity with the flat rigid rails of a ferromagnetic structure which in cross section is preferably a U-shaped channel. This type of holding structure concentrates the magnetic field of one magnetic pole in two or more thin rails in order to develop forces large enough to hold flat the attracted abrasive coated plate without the need for a retaining flange or a cavity to further restrain the abrasive coated plate from moving while it is being used to remove metal or other material in a filing or sharpening operation. The magnet or magnets used to supply the magnetic flux need not be in physical contact with the abrasive coated plate. This construction allows ready replacement of the abrasive coated plate with substitute plates that have a different grit or with new plates where the abrasive is worn.

THE DRAWINGS

FIG. 1 is a side elevational view of a manual file and a sharpening tool in accordance with this invention;

FIG. 2 is a top plan view of the tool shown in FIG. 1;

FIG. 3 is a bottom plan view of the tool shown in FIGS. 1-2;

FIGS. 4-5 are right and left end elevational views of the tool shown in FIGS. 1-3;

Figure 11:
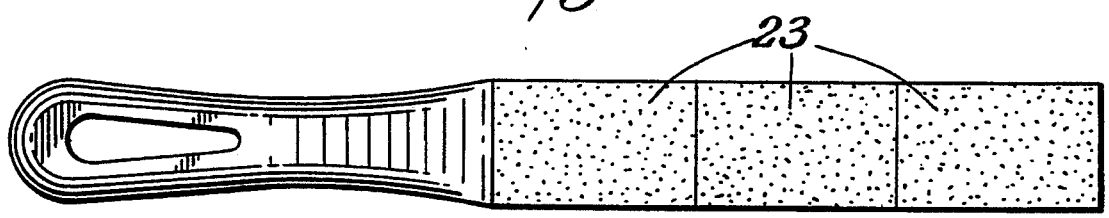
Figure 12:
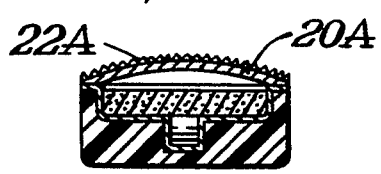

FIGS. 6 and 7 are cross sectional views taken through FIG. 2 along the lines 6—6 and 7—7, respectively;

FIG. 8 is a cross-sectional view in elevation of a portion of a modified tool in accordance with this invention;

FIGS. 9-10 are cross-sectional views in elevation of other variations of tools in accordance with this invention;

FIG. 11 is a plan view of a modified form of manual file and a sharpening tool in accordance with this invention; and FIG. 12 is a view similar to FIG. 7 of a further modification of this invention.

DETAILED DESCRIPTION

The invention is based upon the discovery that very versatile and precise yet economical filing or sharpening hand tools can be made using thin abrasive coated ferromatic plates, preferably sufficiently flexible to conform and be held flat on ferromagnetic rails that provide the necessary flat planer supports for the plate or plates. This arrangement concentrates and conducts magnetic flux in the plate to hold the plate or plates with sufficient force to restrain motion of the plate or plates during the filing or sharpening actions.

Configurations have been developed for hand tools that permit abrasive-coated plates to be supported on opposite sides of the tool. Other configurations use two or more U-shaped channels to support a single abrasive coated plate, thus providing added support and planarity for the plate.

Using the special U-shaped channel to conduct the magnetic flux of one magnetic pole to the work piece through two rigid rails offers a number of advantages over the prior art. This construction concentrates the magnetic flux of that pole along the co-planar narrow lines of contact between the plate and rails holding the plate firmly in place to resist the lateral force that is created when a filing or sharpening action occurs. The line contact is important as it was discovered that large areas of contact do not hold the plates securely enough for this invention to operate. Ideally the rail thickness is on the order of 0.03 to 0.10 inches in width. By constructing the rails so that their line surfaces in contact with the abrasive coated plate lie in a single plane, the flexible abrasive coated plate is pulled down into intimate contact with those surfaces to cause the abrasive surface to lie in a single flat plane. For many applications such as in sharpening knives or chisels it is important that the abrasive surface be in a single flat plane to insure good results. It is preferable to establish a single plane with an average planarity better than ±0.01 inch over the abrasive surface ignoring any surface roughness created by variations in the size of the abrasive particles. Of course, the abrasive grit must be selected to insure maximum uniformity of the grit size. However, in use excessive surface roughness and lack of planarity can be quickly improved as the larger and higher abrasive particles are preferentially worn down.

The preferable abrasive coating is diamonds which cut with minimum force. However, other abrasives can be used. It was discovered when using other abrasives that more force must be applied which if sufficient will displace the ferromagnetic plate. We have found it is desirable also to coat both sides of the ferromagnetic plate with abrasives either in order that the plate can be turned over to expose a fresh abrasive surface or to expose a different type abrasive or a grit of different size. It was discovered that by adding a grit to the side of the plate in contact with the rails, it takes an even greater force to move or dislodge the plate during a filing or sharpening action. A coating of abrasive attached by electroplating or other means to the underside of the plate in contact with the rails provides a roughened surface that will not slip except under extreme force. It was found that this type of restraint cannot be obtained with abrasive coated papers wrapped around the ferromagnetic plate. This is because in that case there is no bond of the abrasive to the plate itself.

It is possible to add additional magnets and rails with the advantage that the added rails can add additional physical support for the abrasive coated plates. For maximum effectiveness the line contact between the rails and the abrasive coated plates must lie in a common plane.

Other magnetic configurations that depend on two or more independent flat ferromagnetic rails, not U-shaped, with at least one rail on each side of the magnet adjacent to a magnetic pole can be used to concentrate magnetic flux and conduct the same to a top abrasive coated ferromagnetic plate. However, it was found that with such arrangements it is difficult to establish or maintain the co-planarity of the upper edges of the rails in a structure sufficiently rigid and durable to support the ferromagnetic plate in a filing or sharpening operation. By contrast the co-planarity is insured with a simple ferromagnetic structure which in cross section is a U-channel that provides maximum strength for support of the plate. The plates should be flexible enough that they will conform adequately to the plane of the rails, but not so flexible as to fail to establish a sufficiently planar abrasive surface. To optimize the conformity of the plate to the rails it is advantageous in some situations to score line grooves across the plate on one or both sides segmenting the plate in a manner that weakens the plate at the grooves allowing it to bend slightly at the grooves as necessary for better conformity to the rails. In a typical case the plates may be on the order of 0.03 to 0.1 inch thick with the line grooves cut or imprinted one quarter to three quarters of the plate thickness. The spacing of the line grooves can vary, but typically are about ¼ to ¾" apart. The depth of grooves on one or both faces must be controlled so as not to cut through the entire plate thickness.

The grooves serve a second function namely to provide recesses below the average abrasive surface where debris created in the filing or sharpening actions can accumulate and then be disposed of. The groove configuration is unique in that it provides flexibility to the abrasive coated ferromagnetic plates in the direction of the length while simultaneously providing a recess for collection of the sharpening debris. The grooves extend in length across the plates and can be of any desired width. The area of the grooves will constitute less than half of the total area of the abrasive coated plate and generally will be less than 20% of the total plate area. Because the plate is imprinted or recessed at the location of each groove, the plate is thinner at that point and the magnetic flux will leak more at that point to the outside surface of the plate helping to capture and retain any ferromagnetic debris in the grooves. By making the plate sufficiently thick between grooves, the flux leakage can be very low in that area in thereby reducing the tendency of such ferromagnetic debris to collect there.

Because of the efficiency of this tool for filing, sanding, honing, etc., it operates well without any type of motorized drive when diamond abrasives are used.

FIGS. 1–7 illustrate the preferred embodiment of the filing and sharpening tool 10 which has a handle 60. The handle 60 could be omitted for special applications. In all embodiments there is one or more magnets and one or more U-shaped channels terminating in narrow rails that conduct the magnetic flux from one magnetic pole of each magnet to the back side of a ferromagnetic plate attracting the same to the rails of the channel.

More specifically, FIGS. 1–7 show this invention in one configuration where a two pole magnet 14 is close fitting into the bottom of the U channel 16 so that the flux from one pole, shown here as the south pole, is conducted through the channel 16 to the rails 18 where that channel contacts a ferromagnetic plate 20 coated with an abrasive coating 22, preferably diamonds of uniform size. The other pole of the magnet 14, shown as the north pole need not touch the ferromagnetic plate 20, thereby allowing the plate 20 to seat firmly and rigidly only on the rails without the risk of being misseated by the magnet 14. The rails are preferably, but not necessarily, parallel. The magnet 14 can be either of the metal, ceramic, or filled plastic type. The lower pole of magnet is preferable in good contact with the lower portion of channel 16 to provide efficient conduction of that pole flux to the ferromagnetic plate 20. The ferromagnetic plate 20 can be coated with one abrasive layer 22 as shown or it may have an abrasive coat 24 or a rough coating of a non-abrasive material on its underside to increase the frictioned drag at the rails 18 as shown in FIG. 8. The magnetic poles can of course be reversed to place the north pole face in contact with the channel 16 with the south pole below the ferromagnetic plate 20.

In another configuration two U channels 26,28 are placed back to back as shown in FIG. 9 with individual two pole magnets 30,32 inserted in each of the channels 26,28. The magnetic poles in contact with the base leg 34,36 of each channel should preferably be of the same polarity, shown as south, in order to deliver maximum flux to the ferromagnetic plates 20. Preferably the channels 26,28 are sufficiently thick to conduct all of the flux from the south poles without significant leakage thereby reducing any repulsive forces between the two channels with the magnets in place. A channel thickness of about 1/16" will generally reduce such leakage adequately. The magnets 30,32 can be arranged with the north poles at the bottom of each channel or one magnet can be reversed so that any force between the channels is attractive rather than repulsive. In this arrangement, abrasive coated ferromagnetic plates 20 are attracted to the rails 38,40 similar to FIG. 1.

In still another arrangement was shown in FIG. 10 U channel 42,44 are placed side by side so as to provide additional intermediate rails 46,48 that can support the ferromagnetic plate 3 physically in the middle of its width to cooperate with end rails 50,52. The close fitting magnets 54,56 will preferably have their poles oriented so that poles of identical polarity are seated in the bottom of each channel 42, 44 as shown here as south. The rails 46,48 need not be as thick in this case as any leakage is of lesser importance, however, with the magnets 54,56 arranged as shown there will be some repulsive force between the channels 42,44 that must in some instances be restrained by a housing 58 as shown in FIGS. 6–7 or by other means. With rails of sufficient thickness, on the order of 1/16" the polarity of one magnet can be reversed with some reduction in the force that acts to hold the ferromagnetic plate 20 in place, against the rails.

FIGS. 2 and 6 show a preferred design for the ferromagnetic plate 20 with an abrasive coating 22. FIG. 2 is a plan view which FIG. 6 shows an elevation of the same plate 20 which has a number of grooves 21 whose length span the width of the plate 3. The grooves 21 are sufficiently deep to act as hinge lines to allow the plate 20 to flex along its length and insure better confirmation with the rails 18. The grooves 21 have sufficient width to collect some portion of the filings removed by the abrasive coating 22 from the workpiece when filing or sharpening. Typically the plate 20 is several inches long but can be shorter or longer to meet various applications. The plate may be made of a plurality of juxtaposed plate members to permit selective replacement of individual members. FIG. 11, for example, illustrates the plate to be formed from a plurality of juxtaposed plate members 23.

FIGS. 1-3 and 6 are preferred configurations for the tool with a handle 60 and an attached housing structure 58 that supports the ferromagnetic channel 16. Handle 60 may have a hole 61 extending completely therethrough so that the tool 10 could be hung from a hook during non-use. The channel 16 has an extension of tang 62 embedded in the handle portion 60 to provide added support for the channel 16. The channel 16 has embossments or lances 64 that are embedded in the structure 58 to add further stability for the channel 16 during vigorous use of the tool 10. Preferably the handle 60 and attached structure 58 are plastic which can be insert molded around and onto the channel 16 and its extension 62, thereby forming the entire tool into a single rigid structure. In any event the handle 60 and attached structure 58 do not interfere with the intimate contact of the ferromagnetic plate 20 with the rails 18 of channel 16. By insert molding the plastic around the channel 16 there is little chance that the parallel rails 18 will be distorted and their upper edge become non-coplanar. Other constructional methods and means can be used but the risk of distorting the rails is increased sufficiently.

In the embodiment shown in FIG. 8 at least one tab 66 is provided at the end of the tool 10 remote from handle 60. Tab 66 may be utilized as a safeguard to assure there is no dislodgement of the plate 20 in a direction away from the handle 60 during misuse of the tool 10 on, for example, a moving machine. FIGS. 1-7, however, illustrate preferred practice of the invention wherein such tabs are omitted and the lowest portion of body structure 58 terminates below plate 20. Thus, there are no structural elements beyond plate 20 which would interfere with the movement of the implement being sharpened when it is stroked in a direction away from handle 60. It is possible to omit such structure because of the effectiveness in the magnetic mounting of plate 20. By omitting upstanding structure such as tabs or rims it is possible to use plates which extend lengthwise and/or widthwise beyond body structure 58. See FIGS. 9-10.

As shown in the various figures the plate is spaced a minimal distance (e.g. a few thousandths of an inch) from the magnet to create an air gap 68 between the plate and the magnet. The air gap assures that there is no surface contact between the plate and the magnet. Additionally, the air gap provides an area of access which may be used for lifting the plate away from the magnet and the rail when it is desired to replace a plate or a plate segment.

FIGS. 7-8 illustrate a practice of the invention wherein the plate does not extend beyond the body structure 58. FIGS. 9-10, however, illustrate a modification wherein the plate is mounted over the respective rails and does extend beyond the rails.

In the embodiment shown herein the tool would have an overall width of about 1.24 inches and the plate 20 would have an overall length of about 6.1 inches. It is to be understood, however, that these dimensions are merely exemplary of a useful tool in accordance with the type of implement for which the tool is used. Thus, where a wider implement is used the tool dimensions could be changed, particularly the width dimensions.

In the illustrated practice of this invention plate 20 is shown as a thin flat plate. The invention may also be practiced with an abrasive coated plate of different shape. For example, specially shaped plates, such as plates having a curved abrasive coated surface, could be used for specific purposes such as abrading a curved surface.

The tool 10 thus represents a marked departure from the prior art by providing a magnetic structure which effectively holds the abrasive coated plate or plate segments to the rails with sufficient strength that the plate remains in place despite the force being applied during the stroking movement of the implement being worked on in a direction away from the handle.

What is claimed is:

1. A tool for filing or abrading surfaces or for sharpening instruments such as knives, chisels, and the like comprising two spaced thin ferromagnetic rails having generally coplanar edges, magnetic means including a magnet between said rails, said magnet having a first pole and a second pole, a ferromagnetic plate having an exposed abrasive coated surface, said plate being adjacent and generally parallel to and spaced from said first pole, said second pole being remote from said plate with said first pole being between said plate and said second pole, said plate being mounted against said rails with said plate against said edges of said rails, and said plate being magnetically held to said edges of said rails by magnetic flux concentrated from said second pole of said magnet which conducts the flux to said plate through said rails with sufficient force to hold said plate in position against said rails when said tool is manually operated without the need for a retaining cavity and without the need for abutting structure to further restrain said plate from lateral moving during use.

2. A tool according to claim 1 wherein said rails are part of a single ferromagnetic structure.

3. A tool according to claim 2 wherein the cross section of said ferromagnetic structure is U-shaped terminated in said rails.

4. A tool according to claim 2 wherein said structure has a handle attached thereto.

5. A tool according to claim 4 wherein said magnetic means containing said ferromagnetic structure is supported by a rigid plastic structure that at least partially surrounds said ferromagnetic structure, and an extension of said rigid plastic structure forming said handle.

6. A tool according to claim 2 wherein the abrasive on said abrasive coated plate is diamonds.

7. A tool according to claim 2 containing a second magnetic means, a second magnet and a second ferromagnetic structure juxtaposed to the first magnetic means with its magnet and ferromagnetic structure to provide added physical support for said first abrasive coated ferromagnetic plate.

8. A tool according to claim 1 wherein said abrasive coated plate is coated with abrasive materials on each of its upper and lower surfaces.

9. A tool according to claim 1 wherein said abrasive coated ferromagnetic plate has a curved abrasive coated surface.

10. A tool according to claim 1 wherein said abrasive coated ferromagnetic plate is a thin flat plate.

11. The tool of claim 1 wherein said abrasive coated surface has a pattern of spaced grooves to create a filing surface.

12. The tool of claim 1 wherein said abrasive coated surface is non-detachably secured to said plate, and said plate being directly against said edges of said rails.

13. A tool for filing or abrading surfaces or for sharpening instruments such as knives, chisels, and the like comprising two spaced thin ferromagnetic rails having generally coplanar edges, magnetic means including a magnet between said rails, a ferromagnetic plate having an exposed abrasive coated surface, said plate being magnetically held to said edges of said rails by magnetic flux concentrated from said magnet which conducts the flux to said plate through said rails with sufficient force to hold said plate in position against said rails when said tool is manually operated, said rails being part of a single ferromagnetic structure, the cross section of said ferromagnetic structure being U-shaped terminating in said rails, said thin rails having a thickness at their terminus in the range of 0.03 to 0.10 inch, and said abrasive coated ferromagnetic plate being a thin flat plate and having a planarity within ±0.01 inch over its entire length.

14. A tool for filing or abrading surfaces or for sharpening instruments such as knives, chisels, and the like comprising two spaced thin ferromagnetic rails having generally coplanar edges, magnetic means including a magnet between said rails, a ferromagnetic plate having an exposed abrasive coated surface, said plate being magnetically held to said edges of said rails by magnetic flux concentrated from said magnet which conducts the flux to said plate through said rails with sufficient force to hold said plate in position against said rails when said tool is manually operated, and said abrasive coated ferromagnetic plate being a thin plate segmented by grooves on at least one side of said plate to enhance its flexibility and ability to be held flat on said rails.

15. A tool according to claim 14 wherein said grooves are linear extending across the width of said plate, the width of each of said grooves being less than 20% of the distance between grooves, and the spacing from groove to groove being less than three quarter of an inch.

16. A tool according to claim 14 wherein the depth of each of said grooves is less than the thickness of the said ferromagnetic abrasive coated plate.

17. A tool for filing or abrading surfaces or for sharpening instruments such as knives, chisels, and the like comprising two spaced thin ferromagnetic rails having generally coplanar edges, magnetic means including a magnet between said rails, a ferromagnetic plate having an exposed abrasive coated surface, said plate being magnetically held to said edges of said rails by magnetic flux concentrated from said magnet which conducts the flux to said plate through said rails with sufficient force to hold said plate in position against said rails when said tool is manually operated, and said rails being part of a single ferromagnetic structure, the thickness of said ferromagnetic plate being reduced sufficiently in selected areas to provide recessed areas where some fraction of said magnetic flux can escape through said plate to attract and collect sharpening debris in said recessed area.

18. A tool for filing or abrading surfaces or for sharpening instruments such as knives, chisels, and the like comprising two spaced thin ferromagnetic rails having generally coplanar edges, magnetic means including a magnet between said rails, a ferromagnetic plate having an exposed abrasive coated surface, said plate being magnetically held to said edges of said rails by magnetic flux concentrated from said magnet which conducts the flux to said plate through said rails with sufficient force to hold said plate in position against said rails when said tool is manually operated, and said rails being part of a single ferromagnetic structure, a second magnetic means, comprising a second magnet and a second ferromagnetic structure holding a second abrasive coated ferromagnetic plate on the reverse side of the tool.

19. A tool for filing or abrading surfaces or for sharpening instruments such as knives, chisels, and the like comprising two spaced thin ferromagnetic rails having generally coplanar edges, magnetic means including a magnet between said rails, a ferromagnetic plate having an exposed abrasive coated surface, said plate being magnetically held to said edges of said rails by magnetic flux concentrated from said magnet which conducts the flux to said plate through said rails with sufficient force to hold said plate in position against said rails when said tool is manually operated, and said plate comprising a plurality of juxtaposed plate members.

* * * * *